US010051426B2

(12) United States Patent
Castelli et al.

(10) Patent No.: US 10,051,426 B2
(45) Date of Patent: Aug. 14, 2018

(54) PROACTIVE CACHING (71) Applicant: International Business Machines Corporation, Armonk, NY (US)

(72) Inventors: Vittorio Castelli, Croton on Hudson, NY (US); Georgiana Dinu, White Plains, NY (US); Radu Florian, Danbury, CT (US); Gourab Kundu, White Plains, NY (US); Taesun Moon, Scarsdale, NY (US); Avirup Sil, Ossining, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 15/220,610

(22) Filed: Jul. 27, 2016

(65) Prior Publication Data
US 2018/0035259 A1 Feb. 1, 2018

(51) Int. Cl.
*H04W 24/00* (2009.01)
*H04W 4/029* (2018.01)
*H04W 4/02* (2018.01)
*H04M 3/42* (2006.01)
*H04W 84/12* (2009.01)
*H04W 88/02* (2009.01)

(52) U.S. Cl.
CPC ....... *H04W 4/029* (2018.02); *H04M 3/42178* (2013.01); *H04W 4/028* (2013.01); *H04W 84/12* (2013.01); *H04W 88/02* (2013.01)

(58) Field of Classification Search
CPC ..... H04W 4/029; H04W 4/028; H04W 84/12; H04W 88/02; H04M 3/42178
USPC ................... 455/456.6, 456.1, 550.1
See application file for complete search history.

(56) References Cited

U.S. PATENT DOCUMENTS

| 9,058,324 | B2* | 6/2015 | Kohlenberg | H04W 4/029 |
| 9,432,961 | B2* | 8/2016 | Rao | H04W 4/029 |
| 9,571,982 | B2* | 2/2017 | Smith | H04W 4/028 |

(Continued)

FOREIGN PATENT DOCUMENTS

WO    WO 2007108869 A1 *  9/2007  ............. G01C 21/32

OTHER PUBLICATIONS

De Domenico, et al., "Interdependence and Predictability of Human Mobility and Social Interactions", Pervasive and Mobile Computing 9, (2013), pp. 798-807, Elsevier (Online Publication).

(Continued)

*Primary Examiner* — Khai M Nguyen
(74) *Attorney, Agent, or Firm* — Cantor Colburn LLP; Rahan Uddin (57) ABSTRACT

Embodiments are directed to a computer implemented method and system of proactively caching content for a mobile electronic device. The method includes determining the location of a mobile electronic device, predicting the location of the mobile electronic device, including a prediction of when the mobile electronic device will be in a location of low or no network connectivity. The data that will be retrieved while the mobile electronic device is not connected to the network is also predicted. Thereafter, the predicted data that will be retrieved is downloaded prior to losing network connectivity so that it can be accessed from memory while the mobile electronic device has low or no network connectivity. Other embodiments are also described.

18 Claims, 3 Drawing Sheets

(56) References Cited

U.S. PATENT DOCUMENTS

| | | | |
|---|---|---|---|
| 2009/0191892 A1* | 7/2009 | Kelley | H04W 48/20 455/456.1 |
| 2013/0143553 A1* | 6/2013 | Beattie, Jr. | H04W 24/08 455/434 |
| 2015/0168164 A1* | 6/2015 | Patil | G01C 21/34 455/421 |
| 2016/0057639 A1* | 2/2016 | Smith | H04W 4/029 455/423 |
| 2016/0373891 A1* | 12/2016 | Ramer | H04W 4/02 |
| 2017/0126833 A1* | 5/2017 | DeLuca | H04W 4/029 |

OTHER PUBLICATIONS

Gonzalez, et al., "Understanding individual human mobility patterns", Nature, 453.7196 (2008): pp. 779-782, (Online Publication).

\* cited by examiner

PROACTIVE CACHING

BACKGROUND

This relates in general to computers. More specifically, this relates to the proactive caching of data on a mobile internet device.

Mobile electronic devices have become very popular. A mobile electronic device, such as a tablet, e-reader, phone, laptop, and the like, connects to the Internet via a wireless connection. One problem that can occur with mobile electronic devices is the loss of Internet connectivity. In some cases, the wireless connection is via Wi-Fi. In some cases, the connection is via a mobile telephony standard, such as fourth generation (4G), 3GPP long term evolution (LTE), LTE Advanced, WiMAX, evolved high speed packet access (HSPA+), high speed packet access (HSPA), universal mobile telecommunications service (UMTS), CDMA2000, EDGE, and other cellular protocols. There can be situations in which mobile connectivity is lost. In such situations, a user might still be interested in accessing data.

SUMMARY

Described herein is a computer-implemented method. The method includes determining, using a processor, the location of a mobile electronic device. The method further includes predicting, using the processor, that the mobile electronic device will be in a location with low or no network connectivity in the near future. Thereafter, a prediction is made, using the processor, of the data that will be used while the mobile electronic device is in the location with low or no network connectivity. The predicted data is retrieved and stored in a memory.

Also described is a computer system. The computer system includes a memory and a processor system coupled to the memory. The processor system is configured to perform a method including determining the location of a mobile electronic device. The method further includes predicting that the mobile electronic device will be in a location with low or no network connectivity in the near future. Thereafter, a prediction is made of the data that will be used while the mobile electronic device is in the location with low or no network connectivity. The predicted data is retrieved and stored in a memory.

Also described is a computer program product. The computer program product includes a computer-readable storage medium with program instructions embodied therewith. The computer-readable storage medium is not a transitory signal per se. The program instructions are readable by a processor system to cause the processor system to perform a method including determining the location of a mobile electronic device. The method further includes predicting that the mobile electronic device will be in a location with low or no network connectivity in the near future. Thereafter, a prediction is made of the data that will be used while the mobile electronic device is in the location with low or no network connectivity. The predicted data is retrieved and stored in a memory.

Additional features are realized through the techniques of the present invention. Other embodiments are described in detail herein and are considered a part of the claimed invention. For a better understanding of the invention with the features, refer to the description and to the drawings.

BRIEF DESCRIPTION OF THE DRAWINGS

The subject matter which is regarded as the invention is particularly pointed out and distinctly claimed in the claims at the conclusion of the specification. The forgoing features are apparent from the following detailed description taken in conjunction with the accompanying drawings in which:

DETAILED DESCRIPTION

Various embodiments will now be described with reference to the related drawings. Alternate embodiments may be devised without departing from the scope of this detailed description. Various connections might be set forth between elements in the following description and in the drawings. These connections, unless specified otherwise, may be direct or indirect, and the present description is not intended to be limiting in this respect. Accordingly, a coupling of entities may refer to either a direct or an indirect connection.

Additionally, a detailed description of a computing device configuration is included, implementation of the teachings recited herein are not limited to a particular type or configuration of computing device(s). Rather, embodiments are capable of being implemented in conjunction with any other type or configuration of wireless or non-wireless computing devices and/or computing environments, now known or later developed.

Clients interact with Internet-based applications, documents, and mobile apps (such as social media apps, maps, games, and the like) over a collection of computers and other hardware components interconnected by communication channels that allow sharing of resources and information, collectively known as the Internet. Such interaction requires an open communication channel between a user's computing device and the internet. Internet-based applications and documents are often displayed through a web browser, which retrieves, presents, and traverses information resources available on the internet. Web applications and documents may include resources identified by a uniform resource locator (URL) that serves as a reference to an Internet resource. One particular type of URL is the Hyper Text Markup Language (HTML). Web browsers interpret the HTML code that is included in web applications and documents and composes them into visible or audible web pages. Other apps may use other techniques to transmit, receive, and display data on a mobile electronic device.

Users often use mobile electronic devices to communicate via the Internet. The communication is typically through the use of web pages and mobile apps. Mobile apps are applications that are programmed to have a special purpose. Typical mobile apps include games, social media providers, news content, email, communication, and the like. While some mobile apps do not require any access to data via the Internet (such as a calculator app or a flashlight app), many mobile apps do require access to the Internet (such as web browsers, multi-player games, social media apps, and the like).

Mobile electronic devices use a variety of different networks to connect to the Internet. Exemplary mobile networks include 4G, LTE, LTE Advanced, WiMAX, HSPA+, HSPA, UMTS, CDMA2000, EDGE, and the like. A user typically has a contract with a service provider which allows the user to connect his mobile electronic device with the network. It is not unusual for a mobile connected device user to encounter regions or areas with low or no network connectivity. This might be due to a building the user is in, the distance to a cell tower or hotspot, or other reasons.

A mobile electronic device might also be able to determine the location of the mobile electronic device.

Turning now to an overview, one or more embodiments provide a methodology for improving the online experience of mobile Internet users by proactively retrieving information via the Internet in anticipation of a predicted loss of network coverage. In one or more embodiments, based on a user's movement patterns, along with wireless coverage information, a predictive model is developed and used to forecast whether a user will be visiting an area with poor data coverage for a sustained period of time. In one or more embodiments, a user's browsing behavior and activity on their mobile devices is analyzed and used to preemptively download and cache content that would be of interest to the user when the user is about to enter an area with poor data coverage. Thus, embodiments proactively retrieve and cache information that the user is likely to want to access even when the user is in a wireless dead zone such as inside Grand Central Station in New York. Thus, one or more embodiments provide a connected mobile device user with connectivity or a useful alternative to connectivity even when connections are temporarily unavailable.

Figure 1:
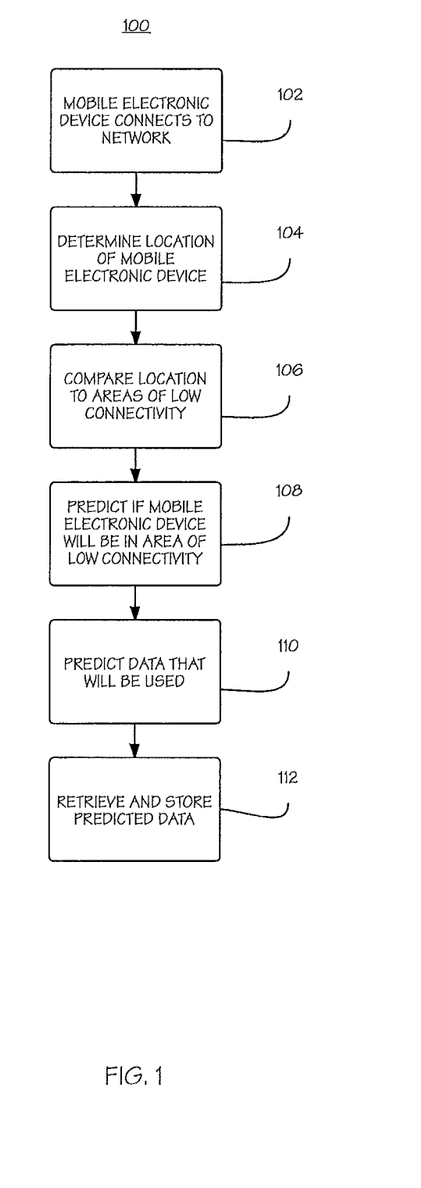
FIG. 1 is a flow diagram illustrating the operation of an embodiment.

Turning now to a more detailed description of one or more embodiments, a flowchart illustrating a method 100 is presented in FIG. 1. Method 100 is merely exemplary and is not limited to the embodiments presented herein. Method 100 can be employed in many different embodiments or examples not specifically depicted or described herein. In some embodiments, the procedures, processes, and/or activities of method 100 can be performed in the order presented. In other embodiments, the procedures, processes, and/or activities of method 100 can be performed in any other suitable order. In still other embodiments, one or more of the procedures, processes, and/or activities of method 100 can be combined or skipped.

A mobile electronic device is connected to a network (block 102). The location of the mobile electronic device is determined (block 104). A comparison of the location of the mobile electronic device is made to a list of known areas with low or no Internet connectivity (block 106). A first cognitive algorithm is run to predict if the mobile electronic device will soon be in an area with low or no Internet connectivity (block 108). The threshold value for "low or no Internet connectivity" can vary depending upon a variety of different factors. In some embodiments, the threshold value below which is considered "low or no Internet connectivity" can change depending on the app being used. An app with a high rate of data consumption (e.g., an app that deals with video files) might have a higher threshold than an app with a low rate of data consumption (an app that deals with text files).

If it is predicted at block 108 that the mobile device will soon be in an area with low or no connectivity, a second cognitive algorithm is run to predict data that will be used by the mobile electronic device (block 110). The predicted data is retrieved and stored in memory in a process called caching (block 112). In such a manner, the user can access data even though the user is in an area without Internet connectivity.

There are various components that could be present in the above-described method. There can be a component that stores data regarding the location of areas with low or no Internet connectivity. Such a component might be local, stored on each separate mobile electronic device. Each time the mobile electronic device is in an area with low or no Internet connectivity, the location can be stored in a database. The database can be stored locally on the mobile electronic device. In some embodiments, the database can be stored on a centrally located server. In some embodiments, the database can contain an aggregation of user information to present a more thorough picture of the location of areas of low or no Internet connectivity. In some embodiments, the aggregation of data can be optional to the users of mobile electronic device, for privacy reasons. In some embodiments, a provider can supply information regarding outages and locations.

There can be a component that predicts when a mobile electronic device will soon be in an area with low or no Internet connectivity. This prediction can be made in a variety of different manners. Some users have relatively common schedules. A user might travel, for example, from their home to their school or place of business and take a similar route most weekdays. The historical data can be used to predict when the user will be entering an area with low or no Internet connectivity. For example, if a user takes a commuter train and the user loses connectivity in a certain tunnel, a prediction can be made as to when the mobile electronic device will lose connectivity and the proactive caching can take place beforehand. Such a prediction might also take into account areas where no Internet connectivity is allowed. Examples might include an airplane, the customs area of an airport, movie theaters, and the like. The prediction might also utilize aggregated content to assist in the prediction. For example, a user might never have been in a certain road before, but cognitive algorithm can use aggregated data from a plurality of users to determine that a certain section of the road has low or no Internet connectivity.

The prediction described above can also make a prediction of the length of time the user will be without Internet connectivity. The length of time the user will be without Internet connectivity can be used to predict how much data should be cached. Thus, for the example described above where the user will be entering a tunnel, a relatively small amount of information might be cached. If the user will be entering a location without Internet connectivity and the user might be in that location for a longer period of time (for example, a train station), more data might be cached.

There can be a component that predicts the type of data that will be used. A variety of different techniques can be used to make such a prediction. For example, a user's browsing history with a certain, frequently-visited website can be used to determine how often the user visits certain links presented on the website. For example, on a news website, one user might be more likely to read news about technology issues, another user might be more likely to read news about the local sports team, another user might be more likely to read news about politics. The component can use such information to make a prediction as to what links a user will click. The prediction can later be used to proactively cache the relevant information. Similar predictions can be made for other type of apps. For example, emails can be downloaded prior to the loss of connectivity based on an evaluation of the likelihood of the email being opened in the near future. Social media apps can predict which posts a user will likely open (based on historical usage) such that they get preemptively cached. The prediction can also include a prediction of the amount of data to be stored in a cache.

There can be a component that actively updates or revives background browser tabs. In some mobile browsers, when a user opens a background browser tab, the contents of the website have to be reloaded before they are displayed to the user. In such a situation, the contents of the background browser tab can be refreshed when it is predicted that a user will be entering a location with low or no Internet connectivity.

There also can be a component that has locations of public Wi-Fi hotspots. The location of public Wi-Fi hotspots can be correlated with the list of areas with low or no Internet connectivity. In such a manner, when a user is predicted to be entering an area with low or no Internet connectivity where there is a nearby public Wi-Fi hotspot, the user can be informed of the location of the public Wi-Fi hotspot. For example, to follow up on the example provided above, if a user is about to enter a train station with low or no Internet connectivity, the user can be notified of the location of a coffee shop or other public Wi-Fi hotspot. The user can then travel to the coffee shop or other pubic Wi-Fi hotspot to access the Internet. In conjunction with a navigation app, directions can be provided to the public Wi-Fi hotspot. There can be a notification (using notification features of the mobile operating system) to the user that the user will be provided when it is predicted that a user is approaching an area with low or no Internet connectivity. The Wi-Fi hotspot might be configured based on the user's preferences and capabilities. For example, certain mobile service providers might allow their user's free access to certain Wi-Fi hotspots to which users of another mobile service provider might not have access. In such a case, the Wi-Fi hotspots that are accessible by the particular mobile electronic device can be stored and suggested to the user.

There also can be a component that allows the input of data that will be transmitted at a later time. For example, an email app can allow a user to draft an email. When the user hits a "send" button, the email is stored in memory to be sent later, when network connectivity is available. An app that allows the creation of documents (for example, a cloud-based productivity suite) can similarly store data in memory until network connectivity is available.

Such a feature can be accomplished through the use of an in-memory proxy server. Information that is intended to be sent via an Internet connection is instead captured by the in-memory proxy server. Thereafter, when Internet connectivity is established at a later time, the in-memory proxy server can send the information to the appropriate destination (which is also stored in the proxy server). In such a manner, even an app that has no such capability of off-network usage can be used without Internet connectivity. There might be limitations to such a solution (for example, real-time communication is not possible.). The proxy server can also be used to retrieve and store the data that will be proactively stored. Such a proxy server might operate by storing the URL of the data to be retrieved and retrieving data from that URL. Thereafter, upon a user's request of that data, the proxy server will supply the data instead of using the Internet connection.

Figure 2:
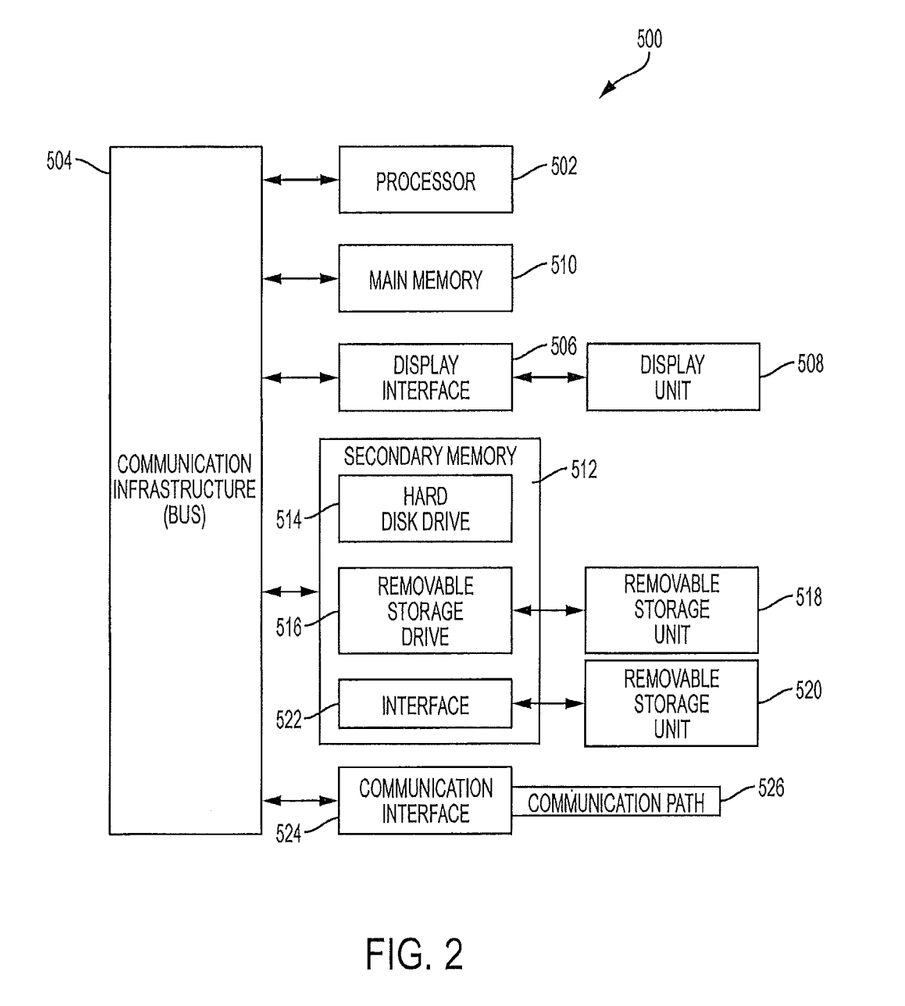
FIG. 2 shows a block diagram of a computer system capable of performing an embodiment.

FIG. 2 depicts a high level block diagram computer system 500, which may be used to implement one or more embodiments. More specifically, computer system 500 may be used to implement hardware components of systems capable of performing methods described herein. Although one exemplary computer system 500 is shown, computer system 500 includes a communication path 526, which connects computer system 500 to additional systems (not depicted) and may include one or more wide area networks (WANs) and/or local area networks (LANs) such as the Internet, intranet(s), and/or wireless communication network(s). Computer system 500 and additional system are in communication via communication path 526, e.g., to communicate data between them.

Computer system 500 includes one or more processors, such as processor 502. Processor 502 is connected to a communication infrastructure 504 (e.g., a communications bus, cross-over bar, or network). Computer system 500 can include a display interface 506 that forwards graphics, textual content, and other data from communication infrastructure 504 (or from a frame buffer not shown) for display on a display unit 508. Computer system 500 also includes a main memory 510, preferably random access memory (RAM), and may also include a secondary memory 512. Secondary memory 512 may include, for example, a hard disk drive 514 and/or a removable storage drive 516, representing, for example, a floppy disk drive, a magnetic tape drive, or an optical disc drive. Hard disk drive 514 can be in the form of a solid state drive (SSD), a traditional magnetic disk drive, or a hybrid of the two. There also may be more than one hard disk drive 514 contained within secondary memory 512. Removable storage drive 516 reads from and/or writes to a removable storage unit 518 in a manner well known to those having ordinary skill in the art. Removable storage unit 518 represents, for example, a floppy disk, a compact disc, a magnetic tape, or an optical disc, etc. which is read by and written to by removable storage drive 516. As will be appreciated, removable storage unit 518 includes a computer-readable medium having stored therein computer software and/or data.

In alternative embodiments, secondary memory 512 may include other similar means for allowing computer programs or other instructions to be loaded into the computer system. Such means may include, for example, a removable storage unit 520 and an interface 522. Examples of such means may include a program package and package interface (such as that found in video game devices), a removable memory chip (such as an EPROM, secure digital card (SD card), compact flash card (CF card), universal serial bus (USB) memory, or PROM) and associated socket, and other removable storage units 520 and interfaces 522 which allow software and data to be transferred from the removable storage unit 520 to computer system 500.

Computer system 500 may also include a communications interface 524. Communications interface 524 allows software and data to be transferred between the computer system and external devices. Examples of communications interface 524 may include a modem, a network interface (such as an Ethernet card), a communications port, or a PC card slot and card, a universal serial bus port (USB), and the like. Software and data transferred via communications interface 524 are in the form of signals which may be, for example, electronic, electromagnetic, optical, or other signals capable of being received by communications interface 524. These signals are provided to communications interface 524 via communication path (i.e., channel) 526. Communication path 526 carries signals and may be implemented using wire or cable, fiber optics, a phone line, a cellular phone link, an RF link, and/or other communications channels.

In the present description, the terms "computer program medium," "computer usable medium," and "computer-readable medium" are used to generally refer to media such as main memory 510 and secondary memory 512, removable storage drive 516, and a hard disk installed in hard disk drive 514. Computer programs (also called computer control logic) are stored in main memory 510 and/or secondary memory 512. Computer programs may also be received via communications interface 524. Such computer programs, when run, enable the computer system to perform the features of the embodiments as discussed herein. In particular, the computer programs, when run, enable processor 502 to perform the features of the computer system. Accordingly, such computer programs represent controllers of the computer system. Thus it can be seen from the forgoing detailed description that one or more embodiments provide technical benefits and advantages.

Figure 3:
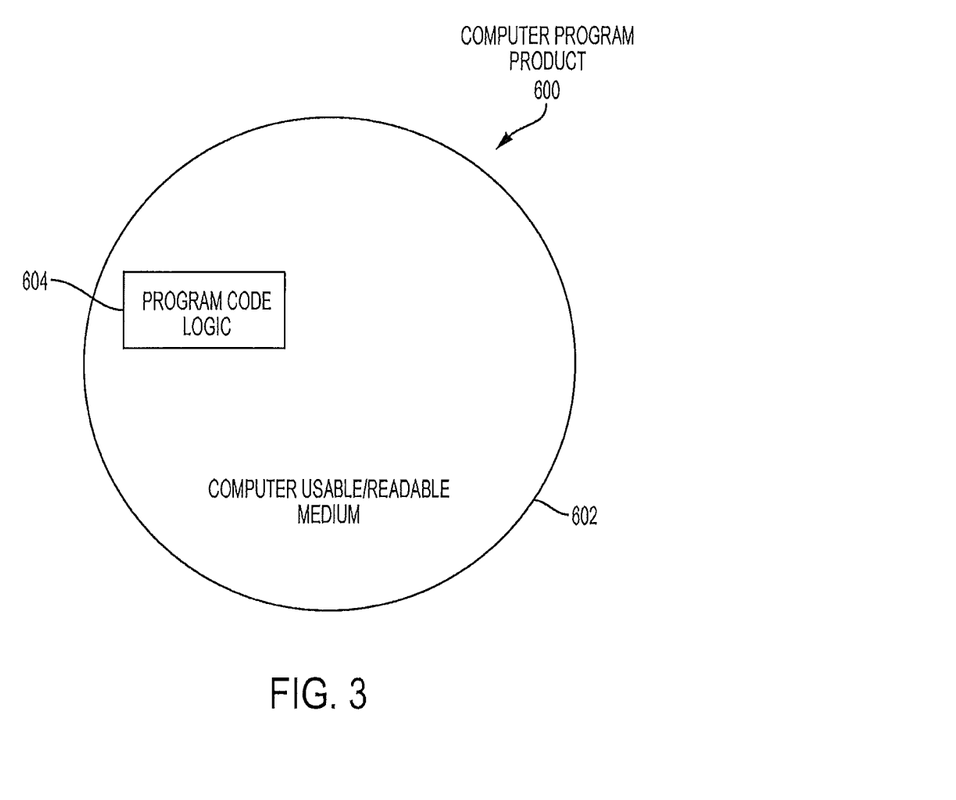
FIG. 3 shows a computer program product capable of performing an embodiment.

Referring now to FIG. 3, a computer program product 600 in accordance with an embodiment that includes a computer-readable storage medium 602 and program instructions 604 is generally shown.

Embodiments may be a system, a method, and/or a computer program product. The computer program product may include a computer-readable storage medium (or media) having computer-readable program instructions thereon for causing a processor to carry out aspects of various embodiments.

The computer-readable storage medium can be a tangible device that can retain and store instructions for use by an instruction execution device. The computer-readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer-readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer-readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer-readable program instructions described herein can be downloaded to respective computing/processing devices from a computer-readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers, and/or edge servers. A network adapter card or network interface in each computing/processing device receives computer-readable program instructions from the network and forwards the computer-readable program instructions for storage in a computer-readable storage medium within the respective computing/processing device.

Computer-readable program instructions for carrying out operations of various embodiments may include assembler instructions, instruction-set-architecture (ISA) instructions, machine instructions, machine dependent instructions, microcode, firmware instructions, state-setting data, or either source code or object code written in any combination of one or more programming languages, including an object-oriented programming language such as Smalltalk, C++ or the like, and conventional procedural programming languages, such as the "C" programming language or similar programming languages. The computer-readable program instructions may execute entirely on the entity's computer, partly on the entity's computer, as a stand-alone software package, partly on the entity's computer and partly on a remote computer or entirely on the remote computer or server. In the latter scenario, the remote computer may be connected to the entity's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer-readable program instructions by utilizing state information of the computer-readable program instructions to personalize the electronic circuitry, in order to perform aspects of various embodiments.

It should be understood that, while portions of this detailed description discuss the use of certain types of files, embodiments are applicable to any type of digital content. Embodiments can be used for the caching of web information, social media information, email information, and the like.

Aspects of embodiments are described herein with reference to flowchart illustrations and/or block diagrams of methods, apparatus (systems), and computer program products according to embodiments. It will be understood that each block of the flowchart illustrations and/or block diagrams, and combinations of blocks in the flowchart illustrations and/or block diagrams, can be implemented by computer-readable program instructions.

These computer-readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer-readable program instructions may also be stored in a computer-readable storage medium that can direct a computer, a programmable data processing apparatus, and/or other devices to function in a particular manner, such that the computer-readable storage medium having instructions stored therein comprises an article of manufacture including instructions which implement aspects of the function/act specified in the flowchart and/or block diagram block or blocks.

The computer-readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The description has been presented for purposes of illustration and description, but is not intended to be exhaustive or limited to the embodiments in the form described. Many modifications and variations will be apparent to those of ordinary skill in the art without departing from the scope and spirit of the description. The embodiment was chosen and described in order to best explain the operation and construction and the practical application, and to enable others of ordinary skill in the art to understand various embodiments with various modifications as are suited to the particular use contemplated.

What is claimed is:

1. A computer-implemented method comprising:
   determining, using a processor, the location of a mobile electronic device;
   predicting, using the processor, that the mobile electronic device will be in a location with low or no network connectivity in the near future;
   predicting data that will be used while the mobile electronic device is in the location with low or no network connectivity;
   retrieving and storing the predicted data in a memory;
   determining a free Wi-Fi hotspot in proximity to the predicted position of the mobile electronic device when it is in the area of low or no network connectivity; and
   providing a notification via the mobile electronic device of a location of the free Wi-Fi hotspot.

2. The computer-implemented method of claim 1 wherein:
   predicting that the mobile electronic device will be in a location with low or no network connectivity comprises using historical usage data of the mobile electronic device to perform a cognitive prediction of the location of the mobile electronic device in the near future.

3. The computer-implemented method of claim 2 wherein:
   predicting that the mobile electronic device will be in a location with low or no network connectivity comprises using historical usage data of a plurality of users to perform a cognitive prediction of the location of the mobile electronic device in the near future.

4. The computer-implemented method of claim 1 wherein:
   predicting that the mobile electronic device will be in a location with low or no network connectivity comprises using outage data from service providers to predict the future location of the mobile electronic device.

5. The computer-implemented method of claim 1 wherein:
   predicting data that will be used by the mobile electronic device further comprises:
   determining an amount of time that the mobile electronic device will be in the area with low or no network connectivity; and
   proactively storing an amount of data that is dependent on the predicted amount of time.

6. The computer-implemented method of claim 1 further comprising:
   using an in-memory proxy server to proactively access and store the predicted data.

7. The computer-implemented method of claim 1 further comprising:
   using an in-memory proxy server to store outbound data from the mobile electronic device; and
   upon entering an area with network connectivity, sending the data from the in-memory proxy server.

8. The computer-implemented method of claim 1 wherein:
   predicting data that will be used by the mobile electronic device comprises using historical usage data of the mobile electronic device to cognitively predict future data that will be accessed using the mobile electronic device.

9. A computer system comprising:
   a memory; and
   a processor system communicatively coupled to the memory;
   the processor system configured to perform a method comprising:
   determining the location of a mobile electronic device;
   predicting that the mobile electronic device will be in a location with low or no network connectivity in the near future;
   predicting data that will be used while the mobile electronic device is in the location with low or no network connectivity;
   retrieving and storing the predicted data in a memory;
   determining a free Wi-Fi hotspot in proximity to the predicted position of the mobile electronic device when it is in the area of low or no network connectivity; and
   providing a notification via the mobile electronic device of a location of the free Wi-Fi hotspot.

10. The computer system of claim 9 wherein:
    predicting that the mobile electronic device will be in a location with low or no network connectivity comprises using historical usage data of the mobile electronic device to perform a cognitive prediction of the location of the mobile electronic device in the near future.

11. The computer system of claim 10 wherein:
    predicting that the mobile electronic device will be in a location with low or no network connectivity comprises using historical usage data of a plurality of users to perform a cognitive prediction of the location of the mobile electronic device in the near future.

12. The computer system of claim 9 wherein:
predicting that the mobile electronic device will be in a location with low or no network connectivity comprises using outage data from service providers to predict the future location of the mobile electronic device.

13. The computer system of claim 9 wherein:
predicting data that will be used by the mobile electronic device comprises using historical usage data of the mobile electronic device to cognitively predict future data that will be accessed using the mobile electronic device.

14. The computer system of claim 9 wherein:
predicting data that will be used by the mobile electronic device further comprises:
determining an amount of time that the mobile electronic device will be in the area with low or no network connectivity; and
proactively storing an amount of data that is dependent on the predicted amount of time.

15. The computer system of claim 9 further comprising:
using an in-memory proxy server to proactively access and store the predicted data.

16. The computer-implemented method of claim 9 further comprising:
using an in-memory proxy server to store outbound data from the mobile electronic device; and
upon entering an area with network connectivity, sending the data from the in-memory proxy server.

17. A computer program product comprising:
a computer-readable storage medium having program instructions embodied therewith, wherein the computer-readable storage medium is not a transitory signal per se, the program instructions readable by a processor system to cause the processor system to perform a method comprising:
determining the location of a mobile electronic device;
predicting that the mobile electronic device will be in a location with low or no network connectivity in the near future;
predicting data that will be used while the mobile electronic device is in the location with low or no network connectivity;
retrieving and storing the predicted data in a memory; and
determining a free Wi-Fi hotspot in proximity to the predicted position of the mobile electronic device when it is in the area of low or no network connectivity; and
providing a notification via the mobile electronic device of a location of the free Wi-Fi hotspot.

18. The computer program product of claim 17 wherein:
predicting that the mobile electronic device will be in a location with low or no network connectivity comprises using historical usage data of the mobile electronic device to perform a cognitive prediction of the location of the mobile electronic device in the near future.

* * * * *